(12) United States Patent
Kaul et al.

(10) Patent No.: US 6,515,123 B2
(45) Date of Patent: Feb. 4, 2003

(54) TRIPHENDIOXAZINE PIGMENTS, INTERMEDIATES, THEIR METHOD OF MAKING AND USES THEREOF

(75) Inventors: Bansi Lal Kaul, Biel Benken (CH); Bruno Piastra, Huningue (FR); Pascal Steffanut, Colmar (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/780,204

(22) Filed: Feb. 9, 2001

(65) Prior Publication Data

US 2001/0031863 A1 Oct. 18, 2001

(30) Foreign Application Priority Data

Feb. 10, 2000 (GB) ................................................ 0002966

(51) Int. Cl.$^7$ ............................ C07D 498/06; D06P 5/00
(52) U.S. Cl. ............................ 544/74; 544/75; 544/76; 544/99; 544/14; 8/506
(58) Field of Search ................................ 544/14, 74, 75, 544/76, 99; 8/506

(56) References Cited

U.S. PATENT DOCUMENTS

| | | | |
|---|---|---|---|
| 5,122,605 A | 6/1992 | Pedrazzi | 544/76 |
| 5,565,563 A | 10/1996 | Kaul et al. | 544/74 |
| 6,162,261 A | 12/2000 | Kempter et al. | 8/506 |
| 6,214,989 B1 | 4/2001 | Kaul et al. | 544/74 |
| 6,255,482 B1 | 7/2001 | Boeglin et al. | 544/74 |
| 6,302,923 B1 | 10/2001 | Haseman | 8/445 |
| 6,319,289 B1 | 11/2001 | Schofberger | 8/543 |
| 6,355,795 B1 | 3/2002 | Boeglin et al. | 544/74 |
| 6,359,131 B1 | 3/2002 | Nagl et al. | 544/99 |

FOREIGN PATENT DOCUMENTS

| | | | |
|---|---|---|---|
| EP | 654506 | * | 5/1995 |
| EP | 761772 | * | 3/1997 |
| EP | 0 889 046 | | 1/1999 |
| EP | 889046 | * | 1/1999 |

OTHER PUBLICATIONS

U.S. Ser. No. 09/800,038, filed Mar. 6, 2001, Kaul, et al.
J.F. Hughes, "Electrostatics Powder Coating", Research Studies, John Wiley & Sons, 1984.
L.B. Schein, "Electrophotography and Development Physics", Springer Series in Electrophysics 14, Springer Verlag, 2nd Edition, 1992.

* cited by examiner

*Primary Examiner*—Mukund J. Shah
*Assistant Examiner*—Sudhaker B. Patel
(74) *Attorney, Agent, or Firm*—Anthony A. Bisulca

(57) ABSTRACT

The invention is directed to carbamate group containing non chloranil based triphendioxazine compounds useful as pigments which are readily convertible into the corresponding triphendioxazine pigments without carbamate.

10 Claims, No Drawings

TRIPHENDIOXAZINE PIGMENTS, INTERMEDIATES, THEIR METHOD OF MAKING AND USES THEREOF

FIELD OF THE INVENTION

The present invention relates to novel non chloranil based triphendioxazine compounds containing carbamate groups, their preparation and their use as pigments and also as pigment precursors which are readily convertible into the corresponding pigments.

SUMMARY OF THE INVENTION

The present invention provides novel carbamate group-containing non chloranil based triphendioxazine compounds which not only can be used as pigments, but are also readily convertible into the corresponding triphendioxazine pigments without carbamate groups and accordingly clear the way to unexpected applications. Included are compounds having N-alkoxycarbonyl groups whose alkyl radicals are branched at the carbon atom which is attached to the oxygen.

DESCRIPTION OF THE PREFERRED EMBODIMENTS

The present invention accordingly provides compounds of the formula (I)

(I)

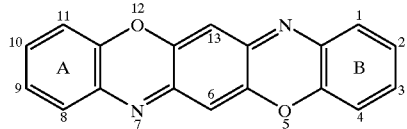

in which the nuclei designated A and B independently of each other comprise annelated rings which are fused on linearly, in 2,3- and 9,10-position, or angularly, in 1,2- and 8,9 or in 3,4- and 10,11-position, to feature the complementary members of heterocyclic groups selected from the moieties (1) to (11)

(1) (2)

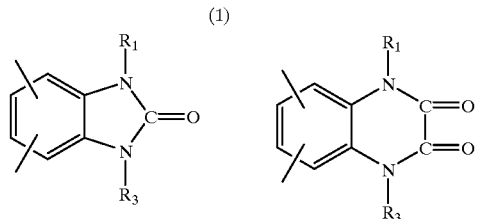

(3) (4)

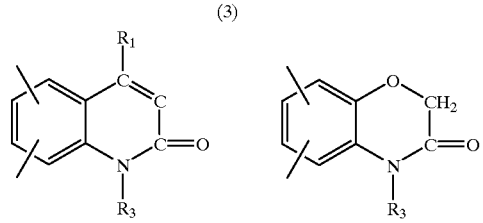

(5) (6)

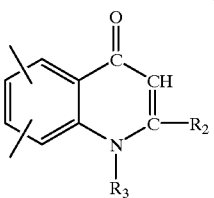 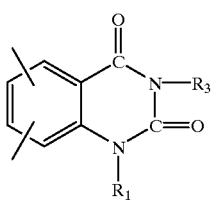

(7) (8)

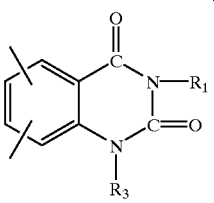 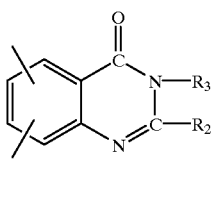

(9) (10)

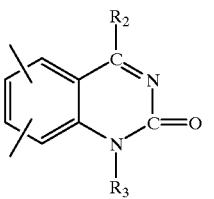 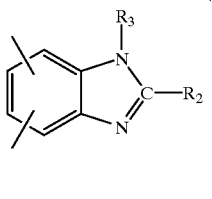

(11)

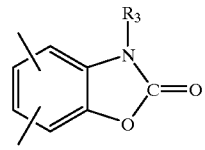

wherein the angular molecules may in 3- and 10-position or in 2- and 9-position bear a $C_{1-2}$alkoxy group, $R_1$ is hydrogen, $C_{1-8}$alkyl, unsubstituted phenyl or phenyl which is mono- or poly-substituted by radicals selected from the group consisting of halogen, nitro groups, $C_{1-8}$alkyl and $C_{1-2}$alkoxy, preferably chlorine or $C_{1-4}$alkyl, $R_2$ is hydrogen, $C_{1-8}$alkyl, unsubstituted phenyl, an amino group or phenyl which is mono- or poly-substituted by radicals selected from the group consisting of halogen, nitro groups, $C_{1-8}$alkyl and $C_{1-2}$alkoxy, preferably chlorine or $C_{1-4}$alkyl;

the radicals $R_3$ are selected from the group consisting of the formulae (II), (III) and (IV)

(II)

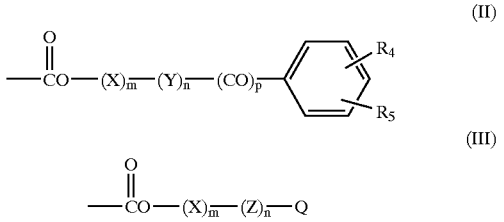

(III)

-continued

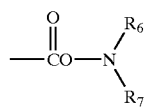
(IV)

wherein
m, n and p are, independently of each other, zero or 1;
X is $C_{1-14}$alkylene or $C_{2-8}$alkenylene;
Y is a group —V—$(CH_2)_q$-;
Z is a group —V—$(CH_2)_r$-;
V is $C_{3-6}$cycloalkylene;
q is an integer from 1 to 6; and
r is an integer from 0 to 6,
$R_4$ and $R_5$ are independently hydrogen, $C_{1-6}$alkyl, $C_{1-4}$alkoxyl, halogen, —CN, —NO$_2$, unsubstituted phenyl or phenoxy or phenyl or phenoxy substituted by $C_{1-4}$alkyl, $C_{1-4}$alkoxyl or halogen;
Q is hydrogen, —CN, $Si(R_4)_3$, a group $C(R_8)(R_9)(R_{10})$, wherein $R_8$, $R_9$ and $R_{10}$ are halogen, a group

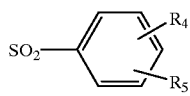

in which $R_4$ and $R_5$ are as defined above
a group $SO_2$—$R_{11}$ or $SR_{11}$, wherein $R_{11}$ is $C_{1-4}$alkyl,
a group $CH(R_{12})_2$, wherein $R_{12}$ is unsubstituted phenyl or phenyl substituted by $C_{1-4}$alkyl, $C_{1-4}$alkoxyl or halogen, or
a group of the formula

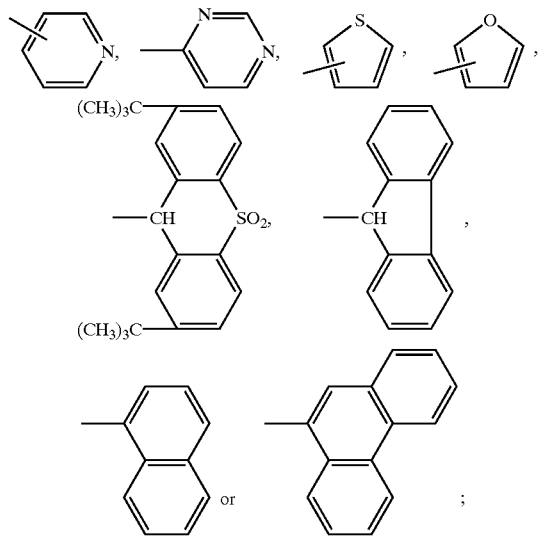

$R_6$ and $R_7$ are, independently of each other, hydrogen, $C_{1-18}$alkyl, a group of the formula

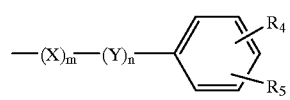

in which X, Y, $R_4$, $R_5$, m and n are as defined above, or $R_6$ and $R_7$ together with the nitrogen atom to which they are bonded form a pyrrolidinyl, piperidinyl or morpholinyl radical, with the proviso that, when $R_3$ is a group of the formula (III), Q is hydrogen and n is zero, then m shall be 1 and X shall be a $C_{2-14}$alkylene or $C_{2-8}$alkenylene group which is branched at the carbon which is attached to the oxygen.

If X denotes $C_{1-14}$alkylene, X is a straight-chain or branched alkylene, for example methylene, dimethylene, trimethylene, 1-methyl-methylene, 1,1-dimethyl-methylene, 1,1-di-methyl-dimethylene, 1,1-dimethyl-trimethylene, 1-ethyl-dimethylene, 1-ethyl-1-methyl-dimethylene, tetramethylene, 1,1-dimethyl-tetramethylene, 2,2-dimethyl-trimethylene, hexa-methylene, decamethylene, 1,1-dimethyl-decamethylene, 1,1-diethyl-decamethylene or tetradeca-methylene.

If X stands for $C_{2-8}$alkenylene, X is a straight-chain or branched alkenylene, for example vinylene, allylene, methallylene, 1-methyl-2-butenylene, 1,1-dimethyl-3-butenylene, 2-butenylene, 2-hexenylene, 3-hexenylene or 2-octenylene.

If any substituent is halogen, then it is for example iodine, fluorine, especially bromine and preferably chlorine;

$C_{1-6}$alkyl is for example methyl, ethyl, n-propyl, isopropyl, n-butyl, sec-butyl, tert-butyl, n-amyl, tert-amyl, hexyl and $C_{1-18}$alkyl is additionally for example heptyl, octyl, 2-ethylhexyl, nonyl, decyl, dodecyl, tetradecyl, hexadecyl or octadecyl;

$C_{1-4}$alkoxy signifies for example methoxy, ethoxy, n-propoxy, isopropoxy, butyloxy, and $C_{1-18}$alkoxy is additionally for example hexyloxy, decyloxy, dodecyloxy, hexadecyloxy or octadecyloxy;

$C_{1-18}$alkylmercapto is for example methylmercapto, ethylmercapto, propylmercapto, butylmercapto, octylmercapto, decylmercapto, hexadecylmercapto or octadecylmercapto;

$C_{1-18}$alkylamino is for example methylamino, ethylamino, propylamino, hexylamino, decylamino, hexadecylamino or octadecylamino.

$C_{5-6}$cycloalkyl is for example cyclopentyl and especially cyclohexyl.

$C_{3-6}$cycloalkylene is for example cyclopropylene, cyclopentylene and especially cyclohexylenes.

In preferred compounds of the formula (I), the moieties

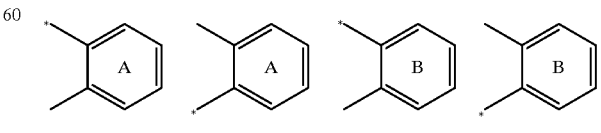

preferably correspond to the formulae (a) to (p)

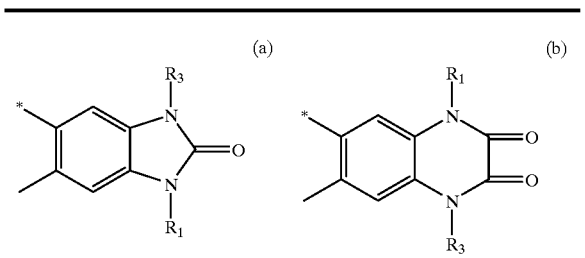
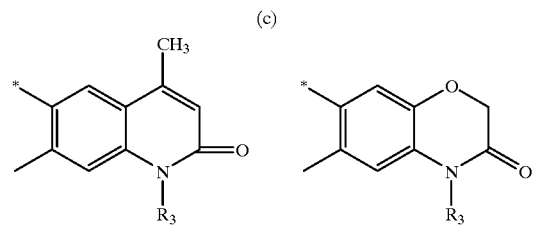
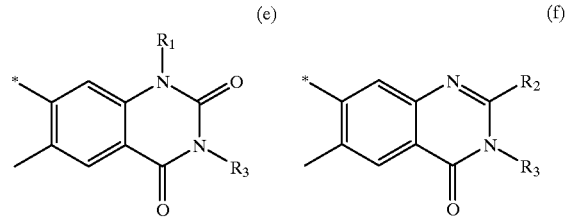
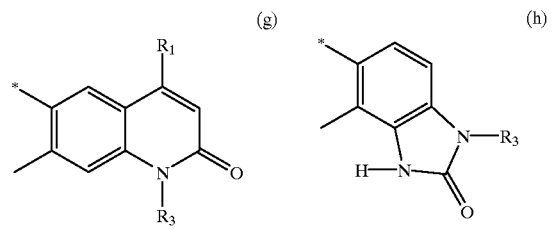
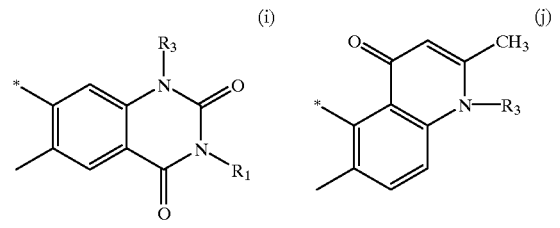
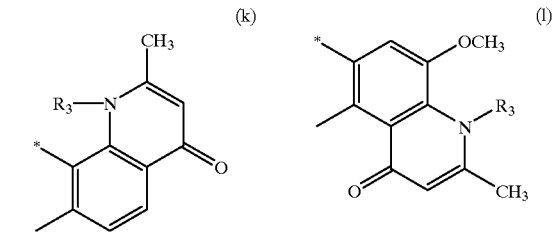
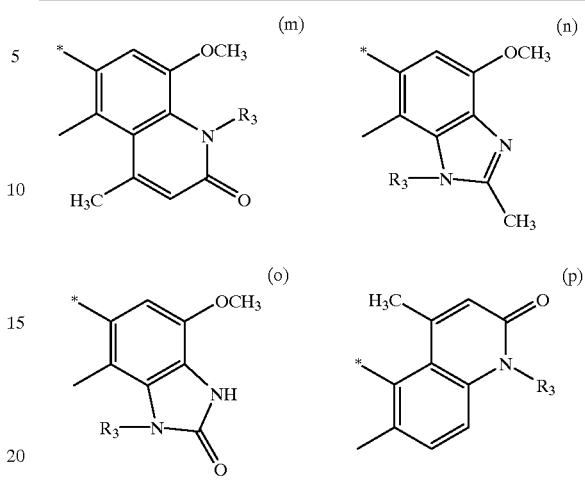

wherein the bond designated with an * leads to the nitrogen atom of the dioxazine ring.

Preferred are compounds of the formula (I) in which $R_3$ represents a group of the formula (V), (VI) or (IV)

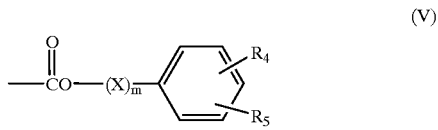 (V)

 (VI)

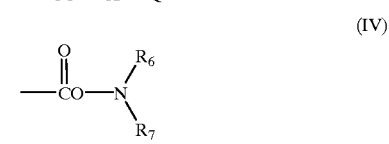 (IV)

wherein
m is zero or 1,
X is $C_{1-4}$alkylene or $C_{2-5}$alkenylene,
$R_4$ and $R_5$ are independently of each other hydrogen, $C_{1-4}$alkyl, methoxy, chlorine or —$NO_2$, and
Q is hydrogen, CN, $CCl_3$, a group

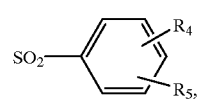

—$SO_2CH_3$ or $SCH_3$,
$R_6$ and $R_7$ are independently of each other hydrogen, $C_{1-4}$alkyl or a group

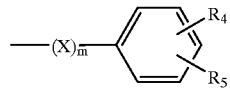

or $R_6$ and $R_7$ form together a piperidinyl radical,
with the proviso that, when $R_3$ is a group of the formula (VI) and Q is hydrogen, then X shall be a group

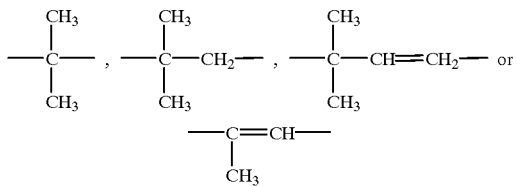

More preferably, the radical $R_3$ signifies a group selected from the group containing of the following formulae

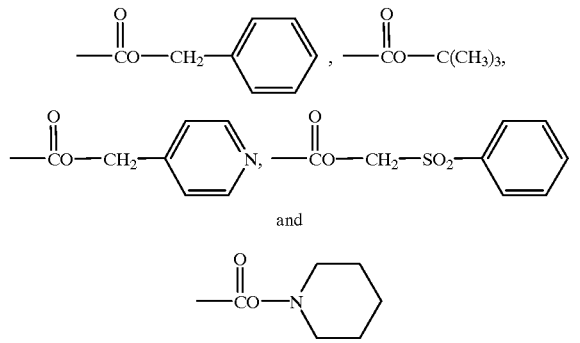

and

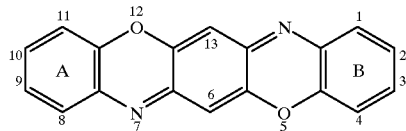

The invention further provides a process for preparing triphendioxazine compounds of the formula (I), characterized in that a compound of the formula (VII)

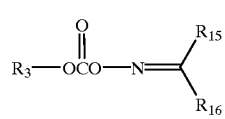
(VII)

wherein the nuclei designated A and B have the same meaning as in formula (I) but $R_3$ is hydrogen,
is reacted in the desired molar ratio with a dicarbonate of the formula (VIII)

$$R_3-O-R_3 \quad (VIII)$$

or with a trihaloacetic ester of the formula (IX)

$$(R_{13})_3C-R_3 \quad (IX)$$

or with a 1:1 mixture of a dicarbonate of the formula (VIII) and a dicarbonate of the formula (X)

$$R'_3-O-R'_3 \quad (X)$$

or with a 1:1 mixture of a trihaloacetic ester of the formula (IX) and a trihaloacetic ester of the formula (XI)

$$(R_{13})_3C-R'_3 \quad (XI)$$

or with an azide of the formula (XII)

$$R_3N_3 \quad (XII)$$

which may also be used in a 1:1 mixture with $$R'_3N_3 \quad (XIII)$$

or with a carbonate of the formula (XIV)

$$R_3-OR_{14} \quad (XIV)$$

which may also be used in a 1:1 mixture with $$R'_3-OR_{14} \quad (XV)$$

or with an alkylideneiminooxyformic ester of the formula (XVI)

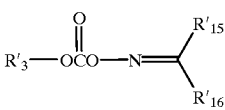
(XVI)

which may also be used in a 1:1 mixture with

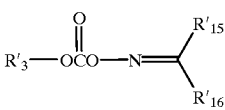
(XVII)

wherein $R_3$ is as defined above and $R'_3$ has a meaning of $R_3$ which is different from $R_3$, $R_{13}$ is chlorine, fluorine or bromine, $R_{14}$ is $C_{1-4}$alkyl or unsubstituted phenyl or phenyl substituted by halogen, $C_{1-4}$alkyl, $C_{1-4}$alkoxyl or —CN, $R_{15}$ is —CN or —COOR$_{14}$, and $R'_{15}$ has a meaning of $R_{15}$ which is different from $R_{15}$, and $R_{16}$ is unsubstituted phenyl or phenyl substituted by halogen, $C_{1-4}$alkyl, $C_{1-4}$alkoxyl or —CN, and $R'_{16}$ has a meaning of $R_{16}$ which is different from $R_{16}$, in an aprotic organic solvent in the presence of a base as catalyst, advantageously at temperatures between 0 and 200° C., preferably between 10 and 100° C., for 2 to 48 hours.

Preferably, the compound of the formula (VII) is reacted with a dicarbonate of the formula (VIII) or with a 1:1 mixture of a dicarbonate of the formula (VIII) and a dicarbonate of the formula (X).

Compounds of the formula (VII), dicarbonates of the formulae (VIII) and (X), trihaloacetic esters of the formulae (IX) and (XI), azides of the formulae (XII) and (XIII), carbonates of the formulae (XIV) and (XV) and alkylideneiminooxyformic esters of the formulae (XVI) and (XVII) are known substances. Should any be novel nonetheless, they can be prepared in analogy to commonly known methods.

The necessary molar ratio between triphendioxazine pigments of the formula (VII) and the compounds of the formulae (VIII) to (XVII) depends on the radicals $R_3$ and $R'_3$ to be introduced. Advantageously, however, the compounds of the formulae (VIII) to (XVII) are used in 2- to 10-fold excess.

Examples of suitable solvents are ethers, such as tetrahydrofuran or dioxane, or glycol-ethers, such as ethylene glycol methyl ether, ethylene glycol ethyl ether, diethylene glycol monomethyl ether or diethylene glycol monoethyl ether, further dipolar aprotic solvents, such as acetonitrile, benzonitrile, N,N-dimethylformamide, N,N-dimethylacetamide, nitrobenzene, N-methylpyrrolidone, halogenated aliphatic or aromatic hydrocarbons, such as trichloroethane, benzene or alkyl-, alkoxy- or halogen-substituted benzene, such as toluene, xylene, anisole or chlorobenzene or aromatic N-heterocycles, such as pyridine, picoline or quinoline. Preferred solvents are for example tetrahydrofuran, N,N-dimethylformamide, N,N-dimethylacetamide or N-methylpyrrolidone. The solvents mentioned can also be used as mixtures. Advantageously, 5–10 parts by weight of solvent are used per 1 part by weight of the reaction participants.

Bases suitable for use as catalyst are for example the alkali metals themselves, such as lithium, sodium or potassium, as well as their hydroxides or carbonates, or alkali metal amides, such as lithium amide, sodium amide or potassium amide, or alkali metal hydrides, such as lithium hydride, sodium hydride or potassium hydride, or alkaline earth or alkali metal alcoholates which are derived especially from primary, secondary or tertiary aliphatic alcohols having 1 to 10 carbon atoms, for example lithium, sodium or potassium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and further organic aliphatic, aromatic or heterocyclic N-bases, including for example diazabicyclooctene, diazabicycloundecene and 4-methylaminopyridine and trialkylamines, for example trimethyl- or triethyl-amine.It is also possible to use mixtures of the afore-mentioned bases.

Preferred are the organic N-bases, for example diazabicyclooctene, diazabicycloundecene and particularly 4-dimethylaminopyridine.

The reaction is preferably carried out at temperatures between 10 and 100° C., particularly between 14 and 40° C., and at atmospheric pressure.

The compounds according to the invention are suitable as pigments or fluorescent dyes for the mass coloration of macromolecular organic material.

Examples of suitable macromolecular organic materials which can be colored with the compounds of the formula (I) according to the invention are vinyl polymers, for example polystyrene, poly-α-methylstyrene, poly-p-methylstyrene, poly-p-hydroxystyrene, poly-p-hydroxyphenylstyrene, polymethyl acrylate, polyacrylamide, as well as the corresponding methacrylic compounds, polymethyl maleate, polyacrylonitrile, polymethacrylonitrile, polyvinyl chloride, polyvinyl fluoride, polyvinylidene chloride, polyvinylidene fluoride, polyvinyl acetate, polymethyl vinyl ether, and polybutyl vinyl ether; novolak resins derived from $C_{1-6}$aldehydes, for example formaldehyde and acetaldehyde, and a bicyclic, preferably monocyclic, phenol, which is optionally substituted by one or two $C_{1-9}$alkyl groups, one or two halogen atoms or a phenyl ring, for example o-, m- or p-cresol, xylene, p-tert-butylphenol, o-, m- or p-nonylphenol, p-chlorophenol or p-phenylphenol, or a compound having more than one phenolic group, for example resorcinol, bis(4-hydroxyphenyl)methane or 2,2-bis(4-hydroxyphenyl)propane; polymers derived from maleimide and/or maleic anhydride, for example copolymers of maleic anhydride and styrene; polyvinylpyrrolidone, biopolymers and derivatives thereof, for example cellulose, starch, chitin, chitosan, gelatin, zein, ethylcellulose, nitrocellulose, cellulose acetate and cellulose butyrate; natural resins and synthetic resins, for example rubber, casein, silicone and silicone resins, ABS, urea- and melamine-formaldehyde resins, alkyd resins, phenolic resins, polyamides, polyimides, polyamide/imides, polysulfones, polyether sulfones, polyphenylene oxides, polyurethanes, polyureas, polycarbonates, polyarylenes, polyarylene sulfides, polyepoxides, polyolefins and polyalkadienes. Preferred macromolecular organic materials are for example cellulose ethers and esters, such as ethylcellulose and nitrocellulose, cellulose acetate or cellulose butyrate, natural resins or synthetic resins, such as polymerization or condensation resins, such as aminoplasts, particularly urea- and melamine-formaldehyde resins, alkyd resins, phenoplasts, polycarbonates, polyolefins, polystyrene, polyvinyl chloride, polyamides, polyurethanes, polyesters, ABS, polyphenylene oxides, rubber, casein, silicone or silicone resins, individually or in mixtures.

The macromolecular organic compounds mentioned can be present individually or in mixtures as plastic masses, melts or in the form of spinning solutions, coatings, paints or printing inks. Depending on the intended use, it is advantageous to use the triphendioxazine compounds according to the invention as toners or in the form of a preparation.

The triphendioxazine compounds according to the invention are particularly useful for the mass coloration of polyesters, polyvinyl chloride and especially polyolefins, such as polyethylene and polypropylene, and ABS, as well as of coatings, and also of powder coatings, printing inks and paints.

Based on the macromolecular organic material to be colored, the triphendioxazine compounds according to the invention can be used in an amount of 0.01 to 30% by weight, preferably of 0.1 to 10% by weight.

The macromolecular organic substances are colored with the triphendioxazine compounds according to the invention for example by mixing the triphendioxazine pigment, optionally in the form of masterbatches, into these substrates using roll mills, mixing apparatus or grinding apparatus. The colored material is then brought into the desired final form according to processes known per se, such as calendering, pressing, extrusion, brushing, casting or injection molding. It is frequently desired, for the manufacture of nonrigid moldings or for reducing their brittleness, to incorporate plasticizers into the macromolecular compounds prior to molding. Examples of useful plasticizers are esters of phosphoric acid, phthalic acid or sebacic acid. Plasticizers can be incorporated into the polymers before or after incorporation of the triphendioxazine pigments according to the invention. To obtain various shades, it is further possible to add to the macromolecular organic substances, in addition to the triphendioxazine pigment according to the invention, also fillers or other color-conferring constituents such as white, color or black pigments, in arbitrary amounts.

To color coatings, paints and printing inks, the macromolecular organic materials and the triphendioxazine compounds according to the invention, optionally together with additives, such as fillers, pigments, siccatives or plasticizers, are finely dispersed or dissolved in a common organic solvent or solvent mixture. One way of accomplishing this is to disperse or dissolve the individual components or several together and only then to combine all components. They can also be used in cosmetic applications and make-up.

In colorings, for example of polyvinyl chloride or polyolefins, the triphendioxazine compounds according to the invention distinguish themselves by their good general properties, such as good migration, light and weather stability.

The quite unexpected ease with which the compounds according to the invention, even in the substrate in which they have already been incorporated, can be converted into the corresponding pigments of the formula (VII) is of great importance. This can be accomplished in a very simple manner, whether by thermal (heating to temperatures between 50 and 400° C., preferably between 100 and 200° C. or laser irradiation), photolytic (illumination, for example with wavelengths below 375 nm) or chemical (with organic or inorganic acids or bases) treatments of the solids containing the compounds according to the invention or of the solutions or dispersions containing the compounds according to the invention in organic or aqueous media, polymer solutions or melts. The aforementioned methods of conversion can also be combined. This makes possible the coloration of coatings, printing inks, particularly ink-jet and plastics, optionally in fiber form having unforeseeably improved properties, such as purity, color strength, brilliance and transparency, as well as interesting applications in analysis.

The non chloranil based triphendioxazine pigments are also suitable as colorants in electrophotographic toners and developers, such as one- or two-component powder toners (also called one- or two-component developers), magnetic toners, liquid toners, polymerization toners and specialty toners (literature: L. B. Schein, "Electrophotography and Development Physics"; Springer Series in Electrophysics 14, Springer Verlag, $2^{nd}$ Edition, 1992).

Typical toner binders are addition polymerization, polyaddition and polycondensation resins, such as styrene, styrene-acrylate, styrene-butadiene, acrylate, polyester and phenol-epoxy resins, polysulphones, polyurethanes, individually or in combination, and also polyethylene and polypropylene, which may comprise further constituents, such as charge control agents, waxes or flow assistants, or may be modified subsequently with these additives.

The non chloranil based triphendioxazine pigments are suitable, furthermore, as colorants in powders and powder coating materials, especially in triboelectrically or electrokinetically sprayable powder coating materials which are used for the surface coating of articles made, for example, from metal, wood, plastic, glass, ceramic, concrete, textile material, paper or rubber (J. F. Hughes, "Electrostatics Powder Coating" Research Studies, John Wiley & Sons, 1984).

Powder coating resins that are typically employed are epoxy resins, carboxyl- and hydroxyl-containing polyester resins, polyurethane resins and acrylic resins, together with customary hardeners. Combinations of resins are also used.

For example, epoxy resins are frequently employed in combination with carboxyl- and hydroxyl-containing polyester resins. Typical hardener components (as a function of the resin system) are, for example, acid anhydrides, imidazoles and also dicyanodiamide and its derivatives, blocked isocyanates, bisacylurethanes, phenolic and melamine resins, triglycidyl isocyanurates, oxazolines and dicarboxylic acids.

In addition, the non chloranil based triphendioxazine pigments are suitable as colorants in ink-jet inks, both aqueous and non-aqueous, and in those inks which operate in accordance with the hot-melt process.

Accordingly, a further object of the invention is macromolecular material comprising in the mass a pigment of the formula (VII)

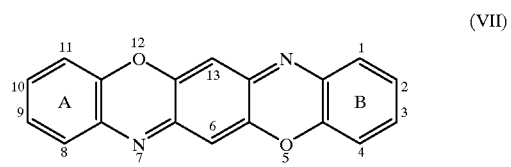

(VII)

wherein the nuclei designated A and B contain annelated rings as defined in formula (I), $R_1$ and $R_2$ have the meanings specified for the formula (I), and $R_3$ is hydrogen, produced in situ by thermal, photolytic or chemical degradation of a compound, of the formula (I)

as well as thermo-, photo- or chemosensitive recording material and also photo-, and electroluminescent materials comprising a compound according to the invention of the formula (I).

Finally, the invention also relates to the use of compounds of the formula (I) according to the invention in cosmetic or make-up materials and to cosmetic compositions containing compounds of formula (I).

The examples hereinbelow illustrate the invention.

EXAMPLES

EXAMPLE 1

A suspension of 10 g of a compound of the formula

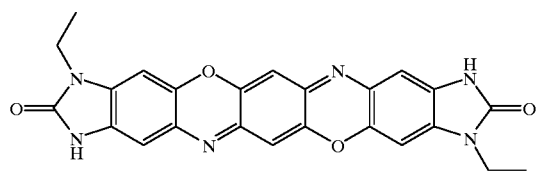

and 38 ml of N,N-dimethylformamide is mixed with 2.3 g of 4-dimethylaminopyridine. 9.6 g of di-tert-butyl dicarbonate are then added over 15 min. This mixture is stirred at room temperature in the absence of moisture. After 6 hours, another 9.6 g of di-tert-butyl dicarbonate are added and stirred in for a further 16 hours. The violet precipitate is filtered off, washed with 50 ml of N,N-dimethylformamide and 200 ml of methanol and then dried at room temperature under reduced pressure to leave 12.5 g of a product of the following formula:

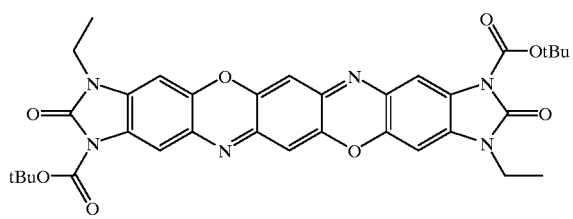

EXAMPLE 2

A suspension of 10 g of a compound of the formula

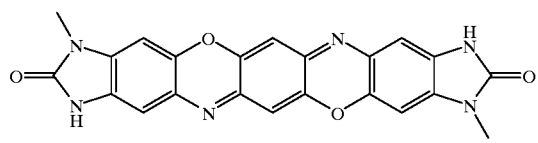

and 40 ml of N,N-dimethylformamide is mixed with 2.6 g of 4-dimethylaminopyridine. 10 g of di-tert-butyl dicarbonate are then added over 15 min. This mixture is stirred at room temperature in the absence of moisture. After 6 hours, another 10 g of di-tert-butyl dicarbonate are added and stirred in for a further 16 hours. The violet precipitate is filtered off, washed with 50 ml of N,N-dimethylformamide and 200 ml of methanol and then dried at room temperature under reduced pressure to leave 12.5 g of a product of the following formula:

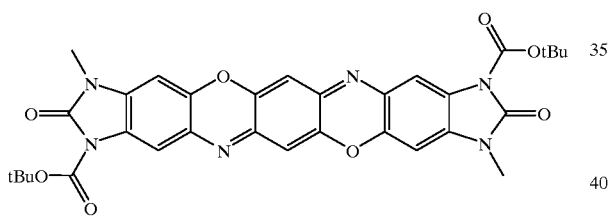

EXAMPLE 3

A suspension of 10 g of a compound of the formula

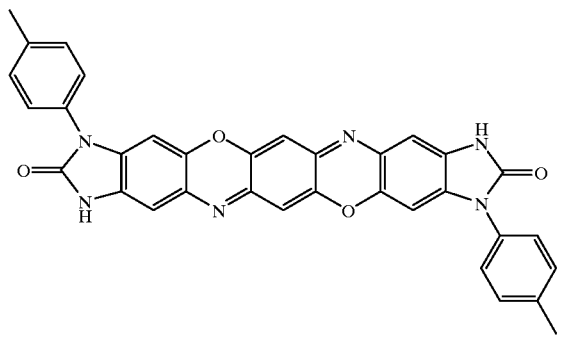

and 30 ml of N,N-dimethylformamide is mixed with 1.83 g of 4-dimethylaminopyridine. 7.6 g of di-tert-butyl dicarbonate are then added over 15 min. This mixture is stirred at room temperature in the absence of moisture. After 6 hours, another 7.6 g of di-tert-butyl dicarbonate are added and stirred in for a further 16 hours. The violet precipitate is filtered off, washed with 30 ml of N,N-dimethylformamide and 100 ml of methanol and then dried at room temperature under reduced pressure to leave 11.8 g of a product of the following formula:

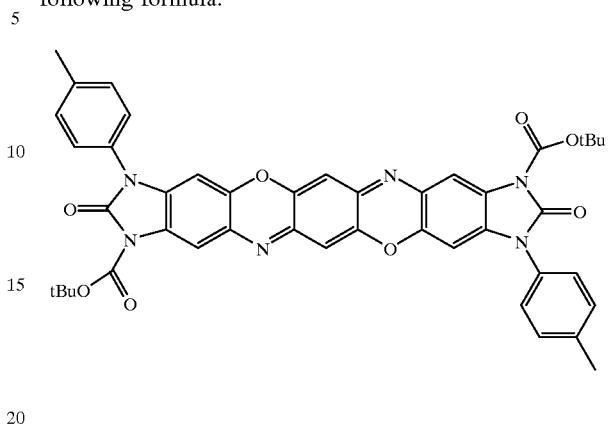

EXAMPLE 4

A suspension of 10 g of a compound of the formula

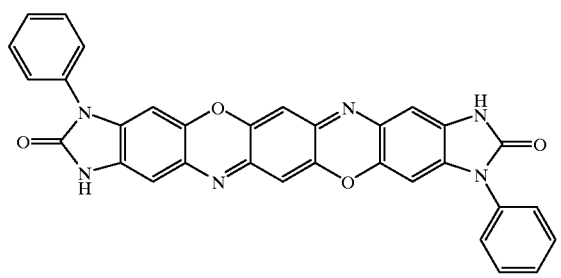

and 31 ml of N,N-dimethylformamide is mixed with 2 g of 4-dimethylaminopyridine. 7.9 g of di-tert-butyl dicarbonate are then added over 15 min. This mixture is stirred at room temperature in the absence of moisture. After 6 hours, another 7.9 g of di-tert-butyl dicarbonate are added and stirred in for a further 16 hours. The violet precipitate is filtered off, washed with 50 ml of N,N-dimethylformamide and 200 ml of methanol and then dried at room temperature under reduced pressure to leave 11.9 g of a product of the following formula:

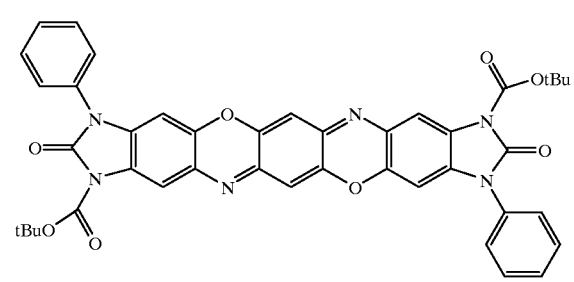

EXAMPLE 5

A suspension of 10 g of a compound of the formula

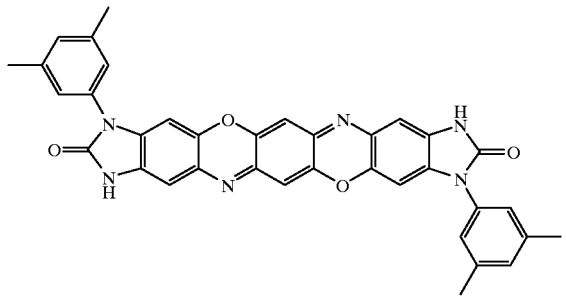

and 40 ml of N,N-dimethylformamide is mixed with 1.8 g of 4-dimethylaminopyridine. 7 g of di-tert-butyl dicarbonate are then added over 15 min. This mixture is stirred at room temperature in the absence of moisture. After 6 hours, another 7 g of di-tert-butyl dicarbonate are added and stirred in for a further 16 hours. The violet precipitate is filtered off, washed with 30 ml of N,N-dimethylformamide and 200 ml of methanol and then dried at room temperature under reduced pressure to leave 11.5 g of a product of the following formula:

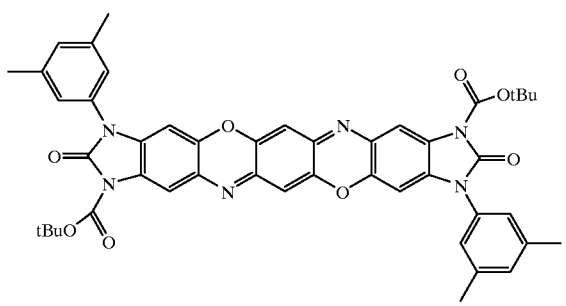

EXAMPLE 6

1 g of the product of Example 1 is heated in a test tube at 200° C. for 40 minutes. This gives 0.659 g of a blue powder (95% of theory). The analytical data of the powder correspond to those of pure diimidazolone (4,5-b;4',5'-m) triphendioxazine-3,11-diethyl-2,10-dione.

EXAMPLE 7

A mixture of 3.62 g of the product of Example 1 and 11.4 g of toluene-4-sulfonic acid monohydrate in 75 ml of N,N-dimethylacetamide is heated to 130° C. with stirring, stirred at 130° C. for 4 hours and then allowed to cool down to room temperature. The precipitated pigment is filtered off, washed first with 25 ml of N,N-dimethylacetamide and then with 75 ml of methanol, and dried at 90° C. under reduced pressure to leave 2.4 g of a blue powder. The analytical data of the powder correspond to those of pure diimidazolone (4,5-b;4',5'-m) triphendioxazine-3,11-diethyl-2,10-dione. The yield of the conversion is 92%.

EXAMPLE 8

4 parts of the pigment of Example 1 are ball-milled with 96 parts of a mixture of 50 parts of a 60 percent solution of cocoaldehyde/melamine resin solution in butanol, 10 parts of xylene and 10 parts of ethylene glycol monoethyl ether for 24 hours. The resulting dispersion is sprayed onto aluminum sheet, air dried for 30 minutes and then baked at 120° C. for 30 minutes. This gives a film having a violet color and very good migration fastness and also good light and weather stability.

EXAMPLE 9

Example of the production of a 0.1% colored PVC film (color pigment reduced 1:5 with white pigment):

16.5 parts of a plasticizer mixture consisting of equal parts of dioctyl phthalate and dibutyl phthalate are mixed with 0.05 part of the pigment of Example 2 and 0.25 part of titanium dioxide. Then 33.5 parts of polyvinyl chloride are added. The mixture is friction rolled for 10 minutes on a two-roll mill, the hide which forms being continually divided with a spatula and rolled up. One of the rolls is maintained at a temperature of 40° C. and the other at a temperature of 140° C. The mixture is then pulled off in the form of a hide and pressed between two polished metal platens at 160° C. for 5 minutes. The result obtained is a violet PVC film of high brilliance and very good migration and light fastness.

What is claimed is:

1. Compounds of the formula (I)

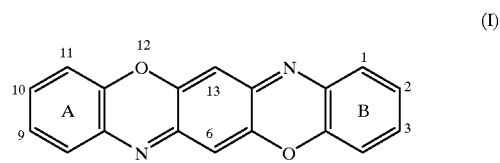

wherein the nuclei designated A and B independently selected from the group consisting of the formulae (a), (h), (n) and (o)

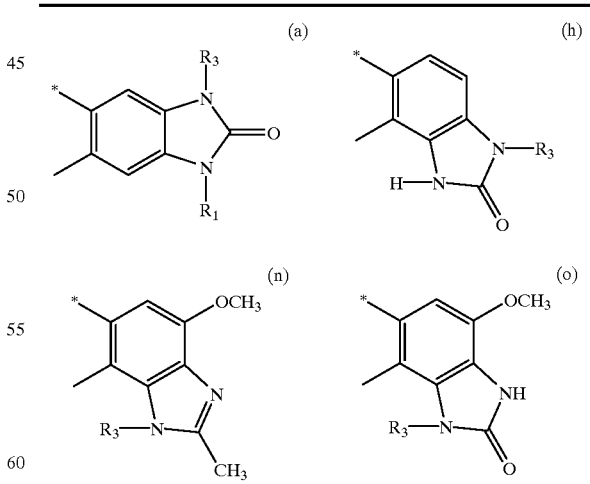

wherein the bond designated with an * leads to the nitrogen atom of the dioxazine ring, $R_1$ is hydrogen, $C_{1-8}$alkyl, unsubstituted phenyl or phenyl which is mono- or poly-substituted by radicals selected from the group consisting of halogen, nitro groups, C$_{1-8}$alkyl and C$_{1-2}$alkoxy, preferably chlorine or C$_{1-4}$alkyl, the radicals R$_3$ are selected from the group consisting of the formulae (II), (III) and (IV)

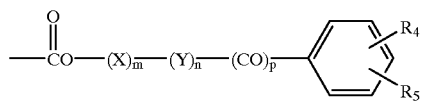
(II)

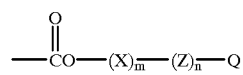
(III)

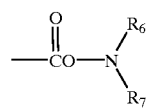
(IV)

wherein m, n and p are independently of each other zero or 1;

X is C$_{1-14}$alkylene or C$_{2-8}$alkenylene;

Y is a group —V—(CH$_2$)$_q$—;

Z is a group —V—(CH$_2$)$_r$—;

V is C$_{3-6}$cycloalkylene;

q is an integer from 1 to 6; and r is an integer from 0 to 6;

R$_4$ and R$_5$ are independently hydrogen, C$_{1-6}$alkyl, C$_{1-4}$alkoxy, halogen, —CN, —NO$_2$, phenyl or phenoxy which is unsubstituted or phenyl or phenoxy substituted by C$_{1-4}$alkyl, C$_{1-4}$alkoxy or halogen;

Q is hydrogen, —CN, Si(R$_4$)$_3$, a group C(R$_8$)(R$_9$)(R$_{10}$), wherein R$_8$, R$_9$ and R$_{10}$ are halogen, a group

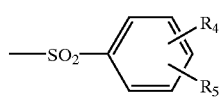

in which R$_4$ and R$_5$ are as defined above, a group —SO$_2$—R$_{11}$ or —SR$_{11}$, where R$_{11}$ is C$_{1-4}$alkyl, a group —CH(R$_{12}$)$_2$, wherein R$_{12}$ is unsubstituted phenyl or phenyl substituted by C$_{1-4}$alkyl, C$_{1-4}$alkoxy or halogen, or a group selected from the group consisting of the following formulae

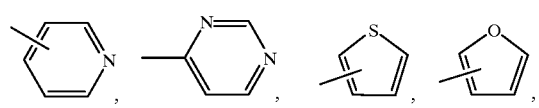

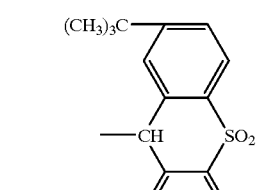

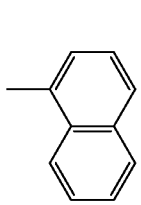
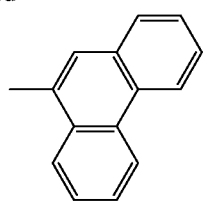
or

R$_6$ and R$_7$ are independently of each other hydrogen, C$_{1-18}$alkyl, a group of the formula

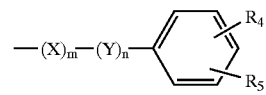

in which X, Y, R$_4$, R$_5$, m and n are as defined above, or

R$_6$ and R$_7$ together with the nitrogen atom to which they are bonded form a pyrrolidinyl, piperidinyl or morpholinyl radical, with the proviso that, when R$_3$ is a group of the formula (III), Q is hydrogen and n is zero, then m shall be 1 and X shall be a C$_{2-14}$alkylene or C$_{2-8}$alkenylene group which is branched at the carbon which is attached to the oxygen.

2. Compounds according to claim 1, in which R$_3$ is a group of the formulae (V), (VI) or (IV)

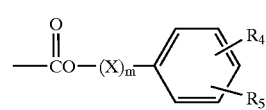
(V)

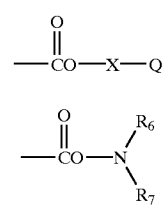
(VI)

(IV)

wherein m is zero or 1,

X is C$_{1-4}$alkylene or C$_{2-5}$alkenylene,

R$_4$ and R$_5$ are independently of each other hydrogen, C$_{1-4}$alkyl, methoxy, chlorine or —NO$_2$, and Q is hydrogen, CN, CCl$_3$, a group

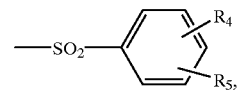

—SO$_2$CH$_3$ or —SCH$_3$,

R$_6$ and R$_7$ are independently of each other hydrogen, C$_{1-4}$alkyl or a group

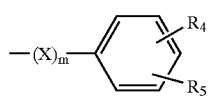

or $R_6$ and $R_7$ form together a piperidinyl radical, with the proviso that, when $R_3$ is a group of the formula (VI) and Q is hydrogen, then X shall be a group selected from the group consisting of the following formulae:

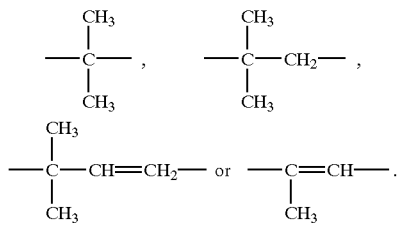

3. Compounds according to claim 1, in which the radicals $R_3$ are selected from the group consisting of the following formulae:

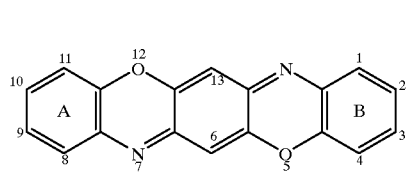

4. Process for preparing compounds of the formula (I) according to claim 1, characterized in that a triphendioxazine compound of the formula (VII)

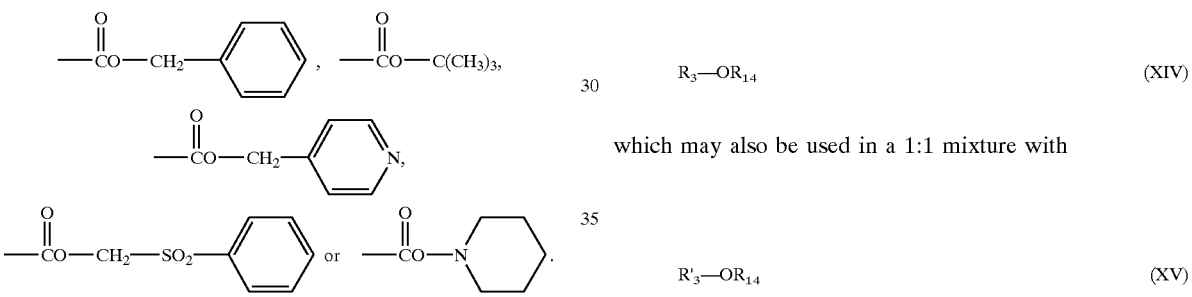
(VII)

wherein the nuclei designated A and B have the same meaning as in formula (I) but $R_3$ is hydrogen, is reacted in the desired molar ratio with a dicarbonate of the formula (VIII)

$R_3$—O—$R_3$ (VIII)

or with a trihaloacetic ester of the formula (IX)

$(R_{13})_3C$—$R_3$ (IX)

or with a 1:1 mixture of a dicarbonate of the formula (VIII) and a dicarbonate of the formula (X)

$R'_3$—O—$R'_3$ (X)

or with a 1:1 mixture of a trihaloacetic ester of the formula (IX) and a trihaloacetic ester of the formula (XI)

$(R_{13})_3C$—$R'_3$ (XI)

or with an azide of the formula (XII)

$R_3N_3$ (XII)

which may also be used in a 1:1 mixture with $R'_3N_3$ (XIII)

or with a carbonate of the formula (XIV)

$R_3$—$OR_{14}$ (XIV)

which may also be used in a 1:1 mixture with $R'_3$—$OR_{14}$ (XV)

or with an alkylideneiminooxyformic ester of the formula (XVI)

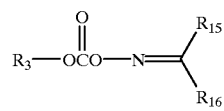
(XVI)

which may also be used in a 1:1 mixture with (XVII)

wherein $R_3$ is as defined in claim 1 and $R'_3$ has a meaning of $R_3$ which is different from $R_3$, $R_{13}$ is chlorine, fluorine or bromine, $R_{14}$ is $C_{1-4}$alkyl, unsubstituted phenyl or phenyl substituted by halogen, $C_{1-4}$alkyl, $C_{1-4}$alkoxy or —CN, $R_{15}$ is —CN or —COOR$_{14}$, and $R_{16}$ is unsubstituted phenyl of phenyl substituted by halogen, C$_{1-4}$alkyl, C$_{1-4}$alkoxy or —CN, R'$_{15}$ and R'$_{16}$ each have a meaning of R$_{15}$ and R$_{16}$, respectively, which is different therefrom, in an aprotic organic solvent in the presence of a base as catalyst.

5. Macromolecular organic material comprising in the mass a compound of formula (I) according to claim 1 as a pigment.

6. A compound of the formula:

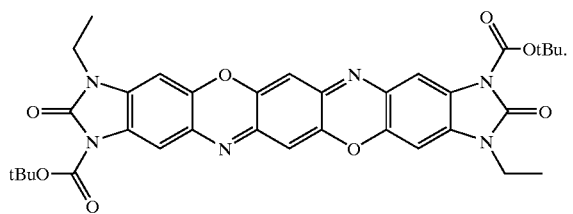

7. A compound of the formula:

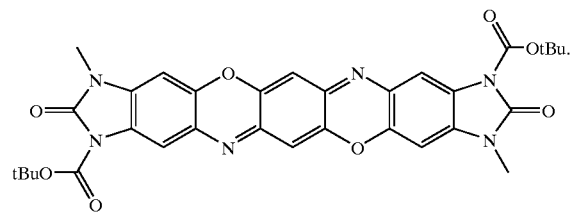

8. A compound of the formula:

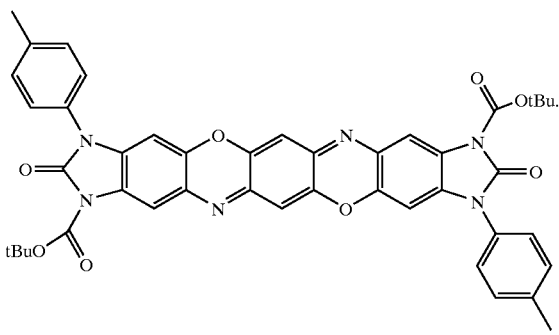

9. A compound of the formula:

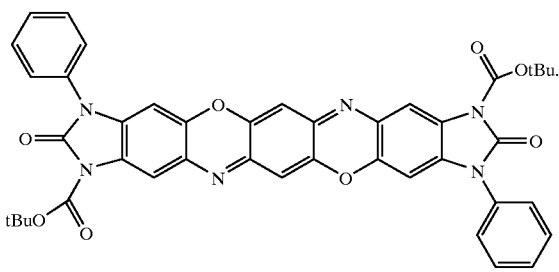

10. A compound of the formula:

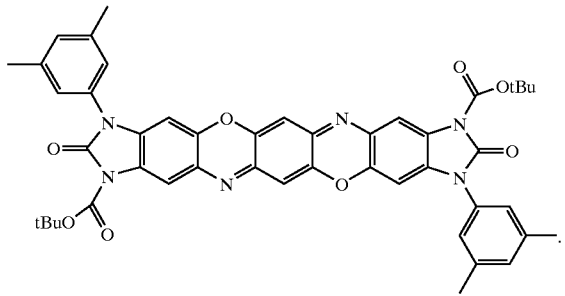

* * * * *